US006436160B1

(12) United States Patent
Stephens et al.

(10) Patent No.: US 6,436,160 B1
(45) Date of Patent: Aug. 20, 2002

(54) DIRT CUP ASSEMBLY FOR VACUUM CLEANER

(75) Inventors: Paul D. Stephens, Twinsburg; Jeffrey M. Kalman, Cleveland Heights; Charles J. Thur, Chardon, all of OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 21 days.

(21) Appl. No.: 09/758,834

(22) Filed: Jan. 11, 2001

(51) Int. Cl.$^7$ .............. A47L 9/16; B01D 50/00; B01D 35/30; B01D 45/12
(52) U.S. Cl. .............. 55/337; 55/419; 55/429; 55/459.1; 55/503; 55/DIG. 3; 15/350; 15/353
(58) Field of Search .............. 55/337, 419, 429, 55/459.1, 503, DIG. 3; 15/331, 334, 335, 350, 353

(56) References Cited

U.S. PATENT DOCUMENTS

| 6,003,196 A | 12/1999 | Wright et al. |
| 6,026,540 A | 2/2000 | Wright et al. |
| 6,070,291 A | 6/2000 | Bair et al. |
| 6,341,404 B1 * | 1/2002 | Salo et al. ............ 15/350 |

* cited by examiner

Primary Examiner—Robert A. Hopkins
(74) Attorney, Agent, or Firm—Fay, Sharpe, Fagan, Minnich & McKee, LLP

(57) ABSTRACT

A dirt cup assembly for a vacuum cleaner includes a dirt cup having a dust collection chamber, a first inlet duct, and a second inlet duct spaced from the first inlet duct. A dirt cup lid can be removably secured to the dirt cup, or can be associated with the vacuum cleaner upper assembly. The dirt cup lid includes a center portion extending over the dust collection chamber, a first wall portion extending over the first inlet duct, and a second wall portion extending over the second inlet duct. A filter assembly is removably positioned within the dust collection chamber.

27 Claims, 7 Drawing Sheets

DIRT CUP ASSEMBLY FOR VACUUM CLEANER

BACKGROUND OF THE INVENTION

This invention relates to vacuum cleaners. More particularly, it relates to a dirt cup assembly for an upright vacuum cleaner.

The use of dirt cups, instead of filter bags, in vacuum cleaners is well known. The dirt cups receive and store suctioned dirt, hair, fibers, and the like. Such dirt cups are secured in place on the vacuum cleaner housing when the vacuum cleaner is in use and are detachable from the vacuum cleaner for emptying.

One way of increasing the amount of suction power available at a distal end of a suction airflow pathway (such as at a floor nozzle, or at an above-the-floor cleaning tool) for a given source of suction power is to reduce the length of the suction airflow pathway. Accordingly, it is considered desirable to develop a new and improved vacuum cleaner having a dirt cup assembly that facilitates minimizing one or more dirty airflow pathways that communicate with the dirt cup.

BRIEF SUMMARY OF THE INVENTION

One aspect of the present invention relates to a dirt cup for a vacuum cleaner.

More particularly in accordance with this aspect of the invention, the dirt cup includes an outer wall; a first inner wall that cooperates with a first portion of the outer wall to define a first inlet duct; a second inner wall that cooperates with a second portion of the outer wall to define a second inlet duct; the first and second inner walls cooperating with a third portion of the outer wall to define a dust collection chamber; and a bottom wall joined to lower end edges of the outer wall, first inner wall, and second inner wall.

In accordance with another aspect of the invention, a dirt cup assembly is provided for a vacuum cleaner. More particularly, in accordance with this aspect of the invention, the dirt cup assembly includes a dirt cup having a dust collection chamber, a first inlet duct, and a second inlet duct spaced from the first inlet duct; and a filter assembly removably positioned within the dust collection chamber.

In accordance with a still another aspect of the present invention, a vacuum cleaner is provided.

More particularly in accordance with this aspect of the invention, the vacuum cleaner comprises a nozzle base; an upper assembly pivotally secured to the nozzle base; and a dirt cup assembly removably secured to at least one of the nozzle base and the upper assembly, the dirt cup assembly including a cup having a dirt collection chamber, a first inlet duct, and a second inlet duct spaced from the first inlet duct, and a filter assembly removably positioned within the dirt collection chamber.

In accordance with yet another aspect of the present invention, a vacuum cleaner is provided. The vacuum cleaner according to this aspect includes a nozzle base; an upper assembly pivotally secured to the nozzle base; and a dirt cup removably secured to at least one of the nozzle base and the upper assembly, the dirt cup including a first inlet duct positioned forward of the upper assembly, and a second inlet duct positioned rearward of the upper assembly.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
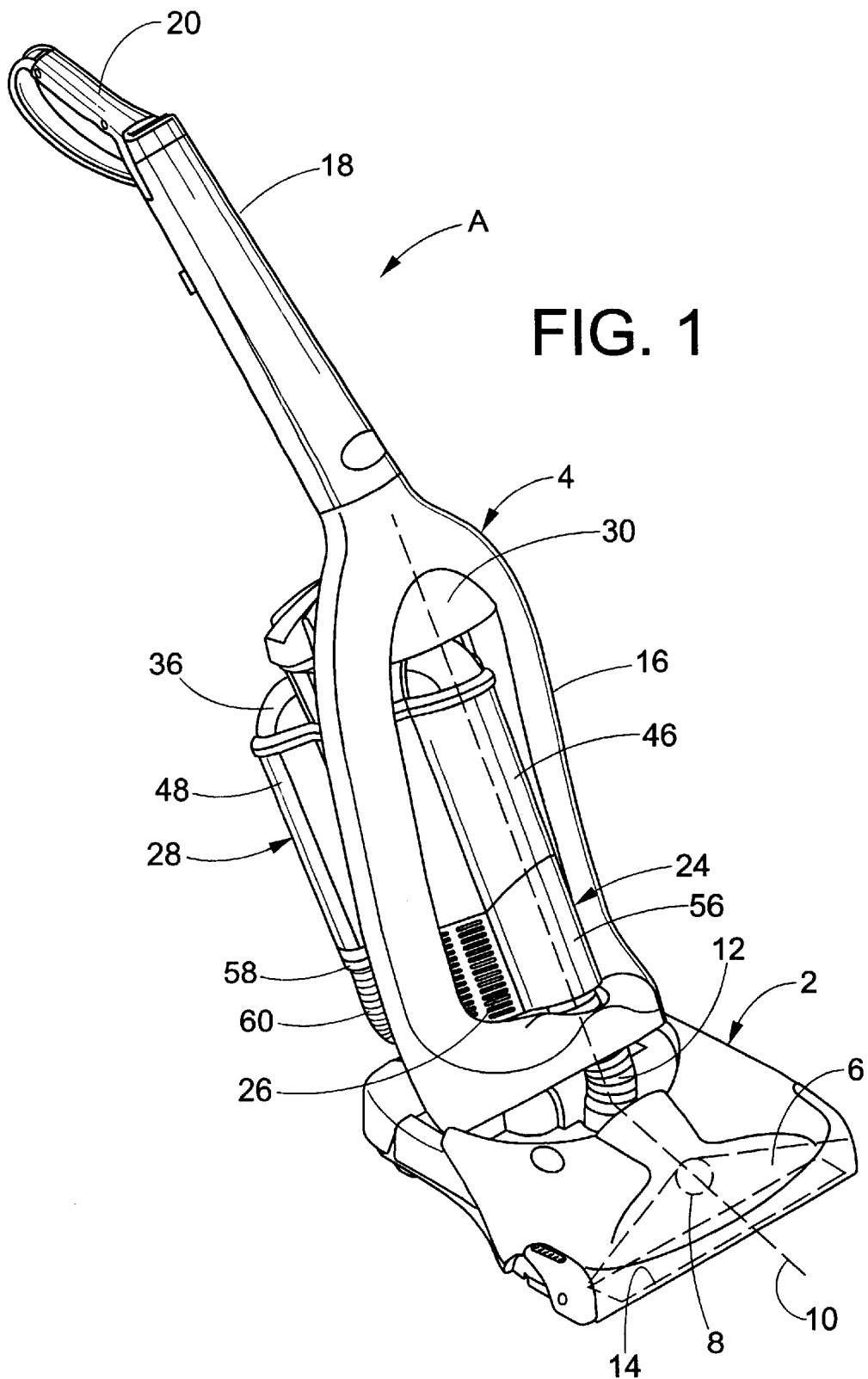
FIG. 1 is a perspective view from the front left of a vacuum cleaner according to the present invention.

Referring now to the drawings, wherein the showings are for purposes of illustrating a preferred embodiment of the invention only and not for purposes of limiting same, FIG. 1 shows the subject dirt cup assembly as embodied in a particular type of upright vacuum cleaner. While the dirt cup assembly can be employed in this type of vacuum cleaner, it should be appreciated that the dirt cup assembly can be used in other types of vacuum cleaners as well.

More particularly, FIG. 1 illustrates a vacuum cleaner A including a wheeled floor nozzle or nozzle base 2 and an upper assembly 4 pivotally secured to the nozzle base 2. The nozzle base 2 is preferably made from a conventional material(s) such as molded plastics and the like. The nozzle base 2 includes a downwardly opening brushroll chamber or cavity 6 (shown in phantom) that extends laterally along a front portion of the nozzle base. The brushroll chamber 6 is adapted to receive and rotatably support a driven agitator or brushroll (not shown). An aperture 8 extends through a rear wall of the brushroll chamber 6. The aperture 8 is substantially centered between two side walls that partially define the brushroll chamber 6. Thus, the aperture 8 is substantially centered on a central longitudinal axis 10 of the vacuum cleaner A.

A discharge duct 12, such as a conventional flexible, helical wire-type hose, communicates with and extends rearwardly from the aperture 8. The duct 12 provides a pathway for suction air that is drawn by a source of suction power (e.g. a fan/motor assembly) through the brushroll chamber 6 from a nozzle inlet 14 associated with the brushroll chamber 6. It should be appreciated that, with the aperture 8 and discharge duct 12 substantially centered along the longitudinal axis 10, a substantially even (i.e. symmetrical) amount of suction air flow can be drawn from each side of the nozzle inlet 14.

Figure 2:
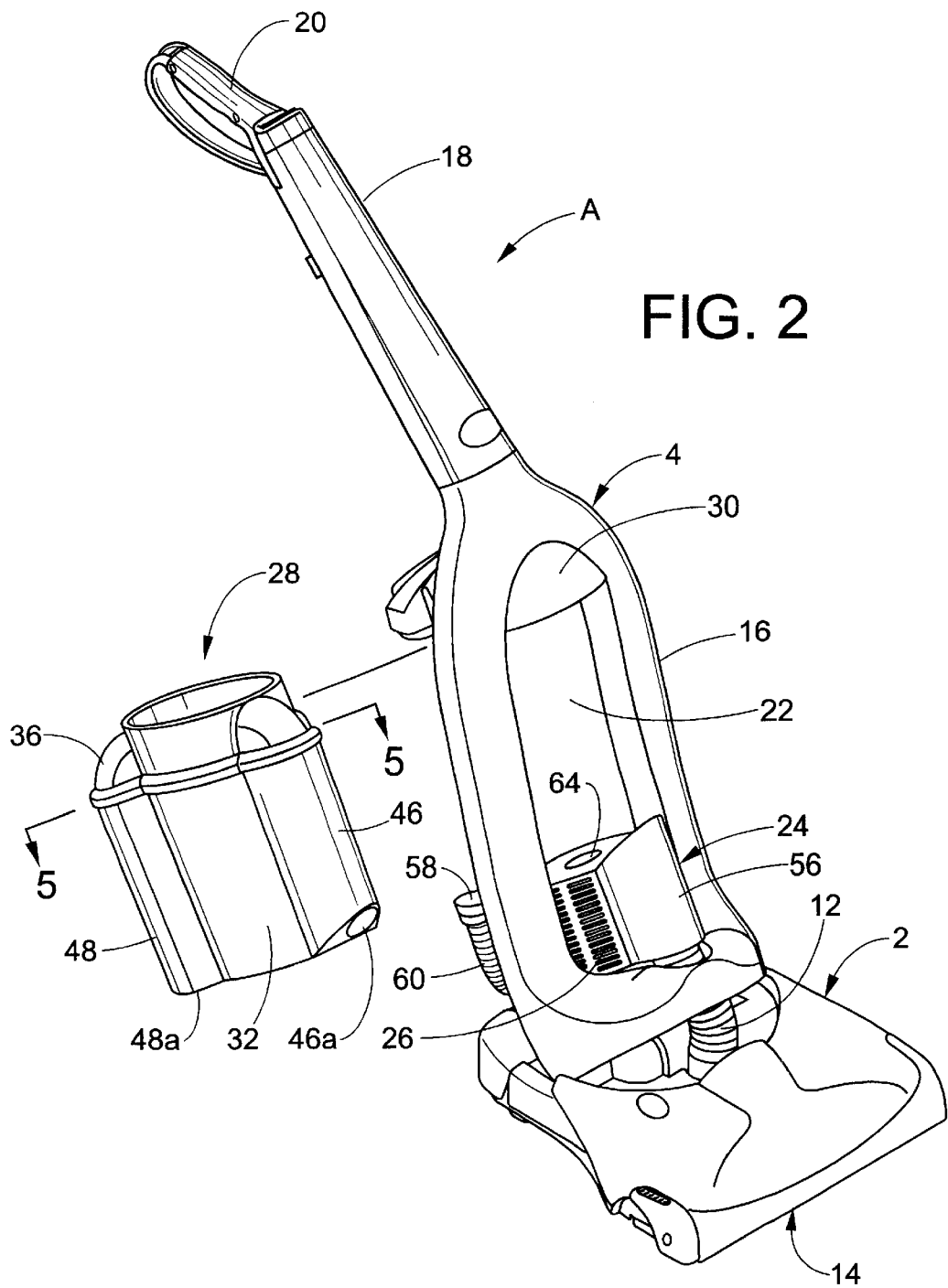
FIG. 2 is a perspective view of the vacuum cleaner of FIG. 1 with a removable dirt cup assembly separated from an upright handle portion.

The vacuum cleaner upper assembly 4 includes a lower handle portion 16, an upper handle portion 18 and a hand grip 20. As best illustrated in FIG. 2, the lower handle portion 16 is generally wishbone or U-shaped, and includes a pair of legs which define between them an opening 22. A motor and filter housing 24 is secured to the lower handle portion 16 within opening 22. A suction motor/fan assembly and a final stage filter (e.g. HEPA) are located in the motor and filter housing 24 as described and illustrated in the Assignee's copending U.S. patent application Ser. No.

09/759,437, the disclosure of which is hereby incorporated by reference. A set of openings 26 are provided in the housing 24 to allow exhaust airflow through the final filter and out of the housing 24.

A dirt cup assembly 28 is removably mounted to the upper assembly 4 above the motor and filter housing 24. A cap 30 is pivotally mounted to the lower handle portion 16 above the dirt cup assembly 28. The cap 30 defines a portion of a latch assembly that cooperates with a catch frame (not shown) to removably secure the dirt cup assembly 28 to the upper assembly 4, as described and illustrated in the Assignee's copending U.S. patent application Ser. No. 09/758,725, the disclosure of which is hereby incorporated by reference. Further, the cap 30 includes at least one indentation on an upper surface thereof, which indentation is shaped to accommodate an associated cleaning tool of the vacuum cleaner.

Figure 3:
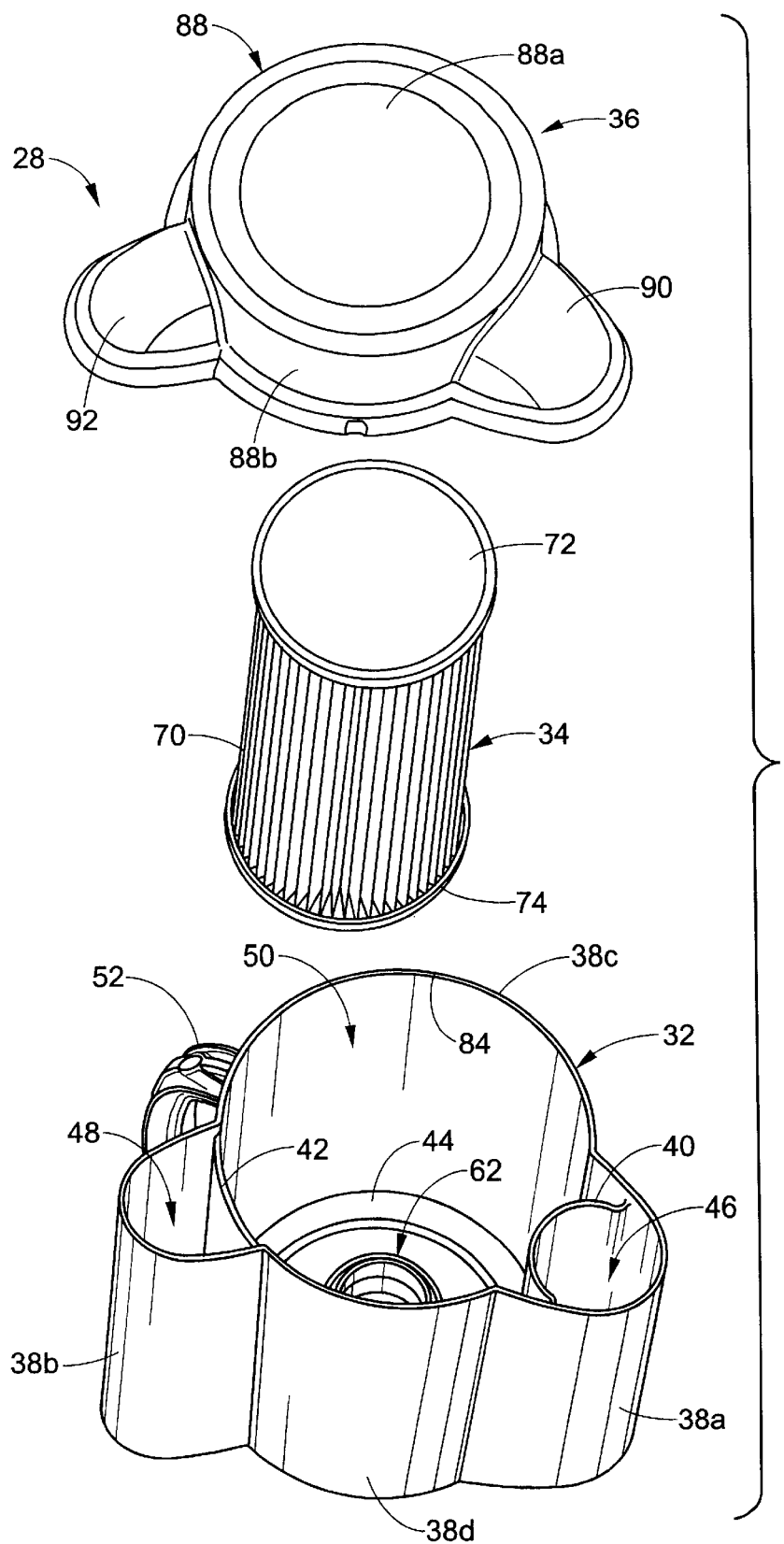
FIG. 3 is an exploded perspective view of the dirt cup assembly of FIG. 2.

Referring now to FIG. 3, the dirt cup assembly 28 includes a dirt cup 32, a primary, main, or first-stage filter assembly 34 removably positioned within the dirt cup 32, and a lid 36 removably covering an open upper end of the dirt cup 32. While the preferred embodiment of the lid 36 is described and illustrated as being removable from the vacuum cleaner A along with the remainder of the dirt cup assembly 28, it is contemplated that the lid 36 can alternatively be fixed, secured, or formed integral with the vacuum cleaner upper assembly 4 (such as cap 30) so that only the dirt cup 32 and depending filter assembly 34 would be removable from the vacuum cleaner.

The dirt cup 32 is formed from an outer wall 38, a first inner wall 40, a second inner wall 42, and a bottom wall 44 joined to or formed integral with the lower end edges of the walls 38–42. A first U-shaped or enlarged portion 38a of the outer wall 38 cooperates with the first inner wall 40 to define a first dirty-air conduit or inlet duct 46. Likewise, a second U-shaped or enlarged portion 38b of the outer wall 38 cooperates with the second inner wall 42 to define a second dirty-air conduit or inlet duct 48. The remaining portions 38c, 38d of the outer wall 38 cooperate with both inner walls 40, 42 to define a dust/debris collection chamber 50. A handle 52 extends from the outer wall 38 at a position substantially opposite (i.e. about 180°) from the inlet duct 46. In addition, the first inlet duct 46 is circumferentially spaced from the second inlet duct by about 120°.

Figure 5:
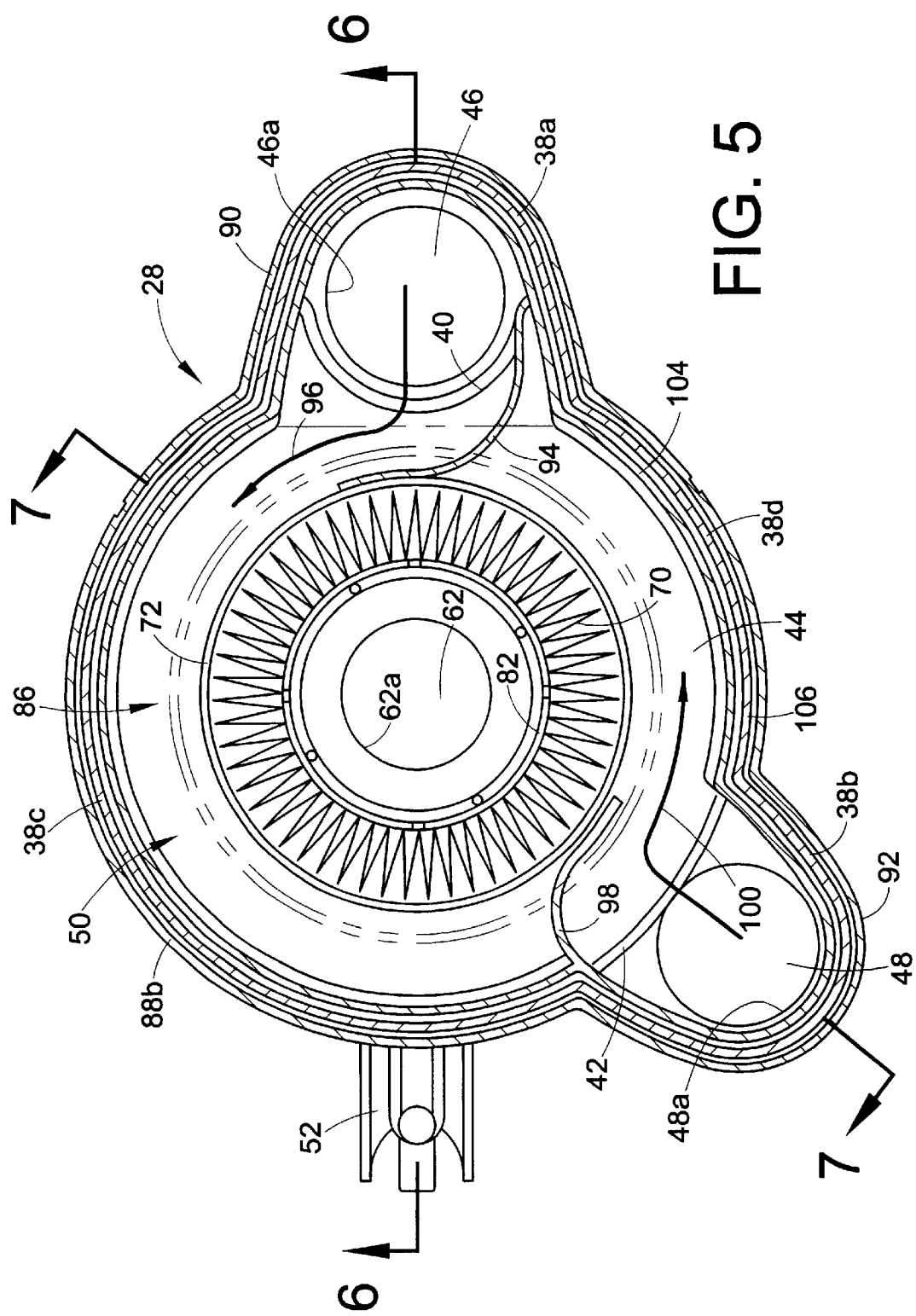
FIG. 5 is a horizontal cross-section view of the dirt cup assembly of FIG. 2 taken along the line 5—5.

As best shown in FIG. 5, each inlet duct 46, 48 includes a respective inlet aperture 46a, 48a through the dirt cup bottom wall 44. Referring again to FIG. 1, when the dirt cup assembly 28 is mounted to the vacuum cleaner, the dirt cup inlet aperture 46a is in fluid communication with the brushroll chamber 6 through the flexible hose 12. In the embodiment being described, the flexible hose 12 extends from the nozzle base 2 to an upper extent of the motor and filter housing 24 through a forward passageway 56 of the housing 24. Additionally, the dirt cup inlet aperture 48a is in fluid communication with an above-the-floor cleaning wand through a connector 58 associated with the motor and filter housing 24 and a depending flexible hose 60 connected thereto.

With continued reference to FIG. 1, it should be appreciated that, with the dirt cup assembly 28 mounted to the vacuum cleaner, the dirt cup inlet duct 46 is positioned forward of the lower handle portion 16, and the dirt cup inlet duct 48 is positioned rearward of the lower handle portion 16. This, in effect, minimizes the lengths of the respective dirty airflow pathways between the dust collection chamber 50 and the brushroll chamber 6 and an above-the-floor cleaning tool, respectively.

Figure 6:
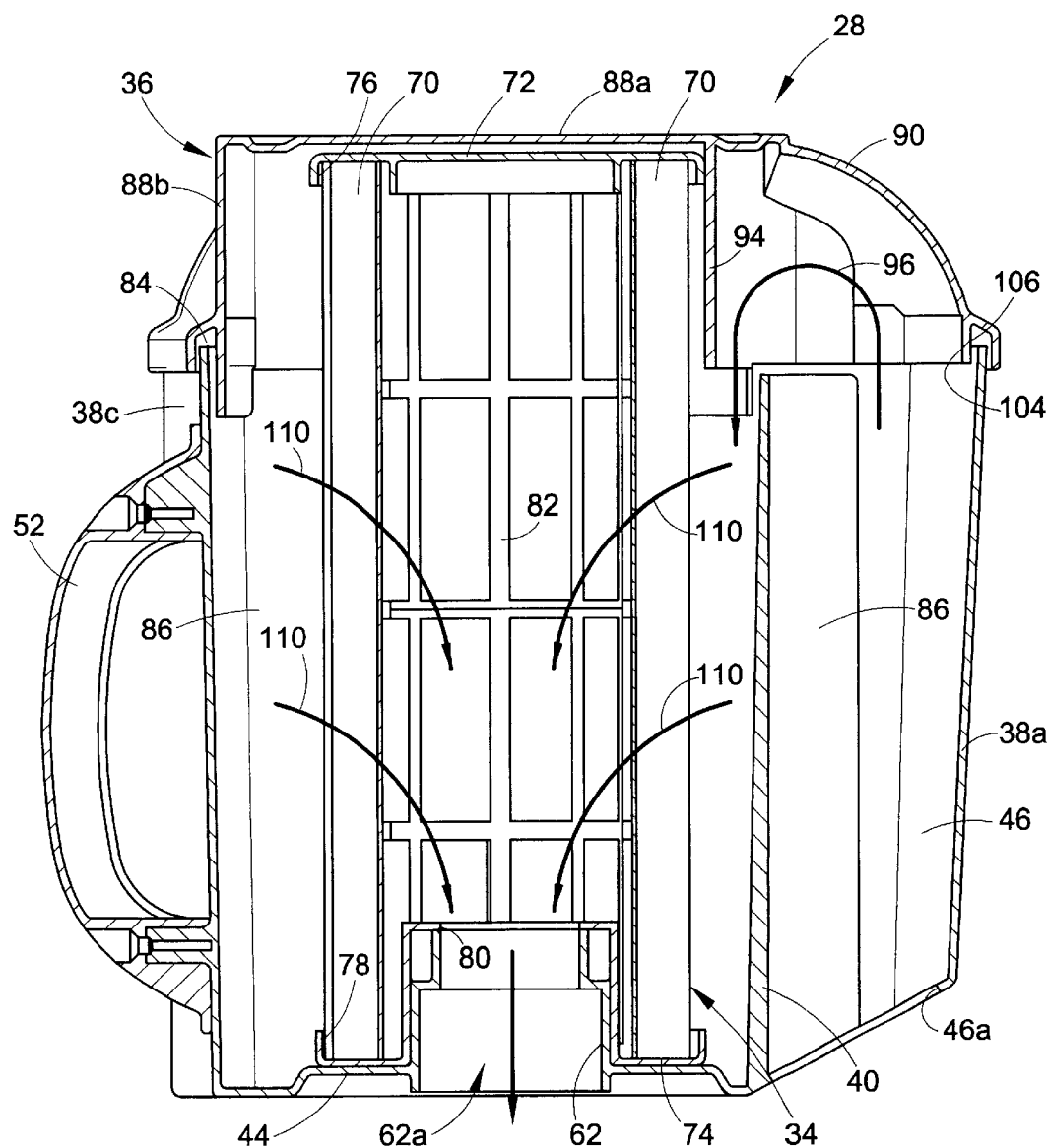
FIG. 6 is a vertical cross-section view of the dirt cup assembly of FIG. 5 taken along the line 6—6.

Referring now to FIG. 6, a main filter support 62 such as a post, stem, boss, hub, or like structure is formed integral with and projects upward from the dirt cup bottom wall 44. The filter support 62 is centrally positioned within in the dust collection chamber 50 and includes an exhaust or outlet passage 62a through the bottom wall 44 and centered on a central longitudinal axis of the dirt cup 32. The exhaust passage 62a communicates with a corresponding central inlet passage 64 (FIG. 2) associated with the motor and filter housing 24 when the dirt cup assembly 28 is attached to the vacuum cleaner.

Referring again to FIG. 3, the primary filter assembly 34 includes a filter medium 70, filter cap 72, and filter ring 74. The filter cap 72 and filter ring 74 are preferably formed from molded plastic. The filter medium 70 is shaped into a hollow, tubular, cylindrical form from a planar, pleated filter membrane. As best shown in FIG. 6, an upper end of the pleated membrane 70 is seated in an annular groove 76 of the filter cap 72. Likewise, a lower end of the pleated filter membrane 70 is seated in an annular groove 78 of the filter ring 74. The filter ring 74 further includes an aperture 80 that communicates with the dirt cup outlet passage 62a when the filter assembly 34 is operatively positioned within the dirt cup 32.

The pleated filter membrane 70 is internally supported on an open frame structure 82 that extends axially between the filter cap 72 and filter ring 74. The open frame structure 82 does not impede airflow through the pleated filter element 70, but ensures that the filter element will not collapse under the force of a suction airstream.

A preferred medium for the filter membrane 70 comprises polytetrafluoroethylene (PTFE), a polymeric, plastic material commonly referred to by the registered trademark TEFLON®. The low coefficient of friction of a filter medium comprising PTFE facilitates cleaning of the filter element by washing. Most preferably, the pleated filter medium 70 is defined substantially or entirely from GORE-TEX®, a PTFE-based material commercially available from W. L. GORE & ASSOCIATES, Elkton, Md. 21921. The preferred GORE-TEX® filter medium, also sold under the trademark CLEANSTREAM® by W. L. GORE & ASSOCIATES, is an expanded PTFE membrane defined from billions of continuous, tiny fibrils. The filter blocks the passage of at least 99% of particles 0.3 $\mu$m in size or larger. Although not visible in the drawings, the inwardly and/or outwardly facing surface of the CLEANSTREAM® filter membrane 70 can be coated with a mesh backing material of plastic or the like for durability since it enhances the abrasion-resistance characteristics of the plastic filter material. The mesh may also enhance the strength of the plastic filter material somewhat.

Alternatively, the filter element 70 can comprise POREX® brand, high-density polyethylene-based, open-celled, porous media available commercially from Porex Technologies Corp. of Fairburn, Ga. 30212, or an equivalent foraminous filter media. This preferred filter media is a rigid open-celled foam that is moldable, machinable, and otherwise workable into any shape as deemed advantageous for a particular application. The preferred filter media has an average pore size in the range of 45 $\mu$m to 90 $\mu$m. It can have a substantially cylindrical configuration, or any other suitable desired configuration. The filter element can also have a convoluted outer surface to provide a larger filtering area. It should be appreciated that some filtration is also performed by any dirt or debris that accumulates in the bottom the dirt cup.

With continued reference to FIG. 6, when the main filter assembly 34 is positioned over the main filter support 62, the main filter assembly 34 extends upward from the bottom wall 44 to a level that is above an upper edge 84 of the dirt cup 32. In addition, the lower filter ring 74 engages the filter support 62 with an interference fit so that the filter assembly 34 is releasably, yet securely, retained in its operative position as shown, even when the dirt cup 32 is removed from the vacuum cleaner and inverted for purposes of emptying the contents thereof. Moreover, an annular cyclonic airflow passage 86 is defined in the dust collection chamber 50 between the main filter assembly 34 and the surrounding portion of the dirt cup 32 over the entire height of the dirt cup 32 when the filter assembly 34 operatively positioned within the dirt cup.

Referring again to FIG. 3, the lid 36 includes a generally-cylindrical center portion 88 having a planar upper wall 88a and a cylindrical side wall 88b. The lid 36 further includes first and second sloped wall portions 90, 92, each of which extends radially outward from the cylindrical side wall 88b. Thus, the dirt cup lid 36 is shaped to engage with the corresponding dirt cup 32. In particular, the center portion 88 extends over the dirt cup dust collection chamber 50, the sloped wall portion 90 extends over the first dirt cup inlet duct 46, and the sloped wall portion 92 extends over the second dirt cup inlet duct 48.

Figure 4:
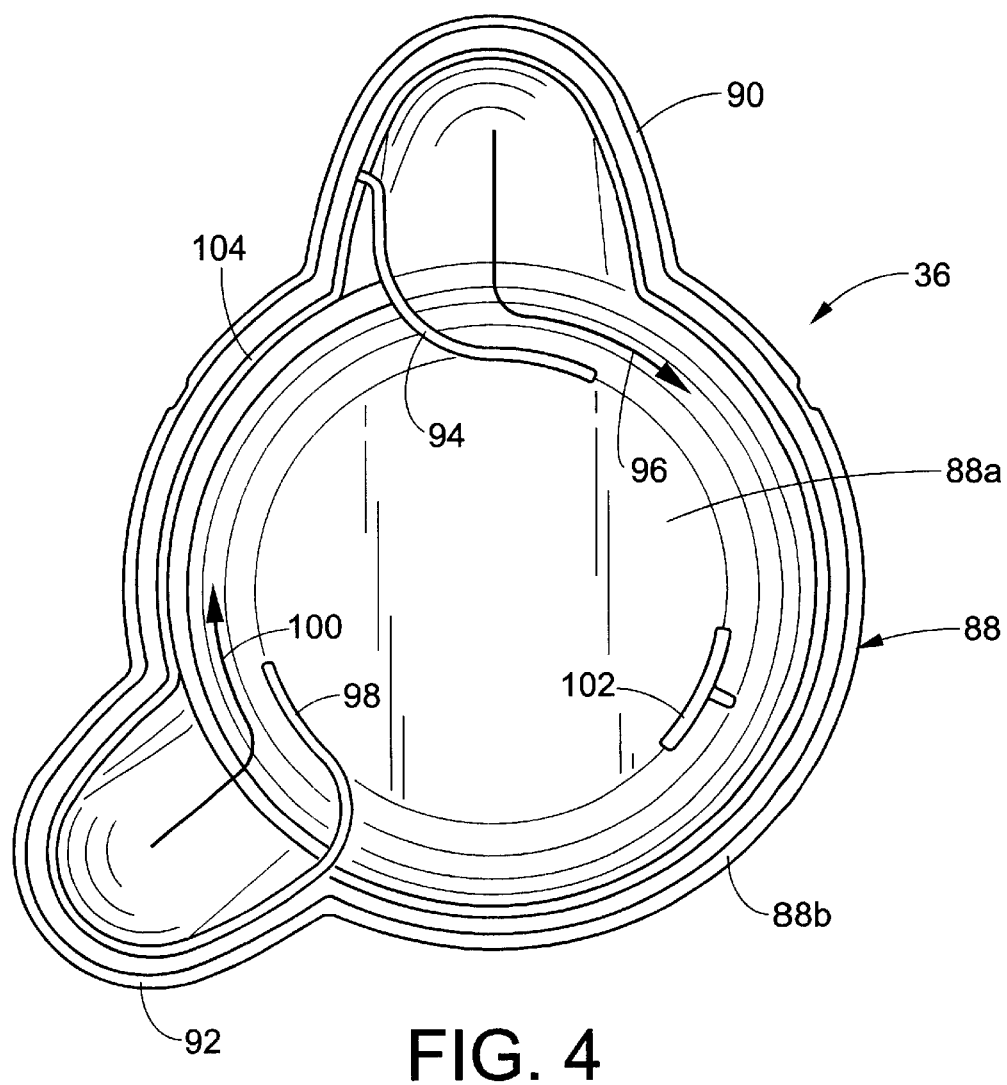
FIG. 4 is a bottom plan view of a lid associated with the dirt cup assembly of FIG. 2.

As best shown in FIG. 4, an angled diverter wall 94, joined to at least the inner surface of upper wall 88a and extending downward to at least the lowermost extent of sloped wall portion 90, is positioned to divert an airflow from the dirt cup inlet duct 46 and sloped wall portion 90 from a radial path to a tangential path (relative to the filter assembly 34) within the annular cyclonic airflow passage 86 as shown by arrow 96. Likewise, a second angled diverter wall 98, also joined to at least the inner surface of upper wall 88a and extending downward to at least the lowermost extent of sloped wall portion 92, is positioned to divert an airflow from the dirt cup inlet duct 48 and sloped wall portion 92 from a radial path to a tangential path (relative to the filter assembly 34) within the annular cyclonic airflow passage 86 as shown by arrow 100. The orientation of the diverter walls 94, 98 will affect the direction of cyclonic airflow within the passage 86, and the invention is not meant to be limited to a particular direction, i.e, clockwise or counterclockwise.

With continued reference to FIG. 4, and particular reference to FIG. 5, the diverter walls 94, 98 and an arcuate rib 102, which rib extends slightly from the inner surface of the lid upper wall 88a, engage an outer surface of the upper filter ring 72 to facilitate centering the filter assembly 34 within the dust collection chamber 50. Lastly, an inner rib 104 is spaced inward from lowermost extent of the cylindrical side wall 88a and the sloped wall portions 90, 92 to define a channel 106 around the periphery of the lid 36, which channel constrains or otherwise accommodates the upper edge 84 of the dirt cup 32 when the lid 36 covers the dirt cup.

It should be appreciated that, if necessary or desired, the filter cap 72 can be provided with a gasket on an upper surface thereof so that when the filter assembly 34 is operatively mounted within the dust cup 32 and the lid 36 is covering the dust cup, the gasket would mate in a fluid-tight manner with the inner surface of the lid upper wall 88a to prevent undesired airflow through an axial space between the lid 36 and filter assembly 34. For convenience, the filter cap 72 can be replaced with a filter ring so that either end of the filter assembly 34 could be mounted to the filter support 62 of the dirt cup 32. In this case, both filter rings could be formed from a compressible, gasket material, or a separate gasket could be mounted to each filter ring, or a gasket could be secured to the lower surface of the lid upper wall 88a.

Referring again to FIG. 6, during on-the-floor cleaning operations utilizing the nozzle base 2, dirty air flows along a substantially straight path from the brushroll chamber aperture 6, through the discharge duct 12, through the dirt cup inlet duct 46, and into the dirt cup cyclonic airflow passage 86. It should be appreciated that, by positioning the dirt cup inlet duct 46 along the vacuum cleaner longitudinal axis 10, the length of the dirty airflow path from the brushroll chamber 6 to the dirt cup dust collection chamber 50 can be minimized thus providing increased suction power in the brushroll chamber 6.

The dirty air flow from the inlet duct 46 into the cyclonic passage 86 is diverted by diverter 94, as illustrated by arrow 96. This causes a cyclonic or vortex-type flow that spirals downward in the passage 86 since the top end thereof is blocked by the lid 36. The air eventually flows radially inward through the filter membrane 70, and then axially downward through the hollow interior of the filter assembly 34 as illustrated by arrows 110.

Subsequently, filtered air flows through the outlet passage 62a, through motor and filter housing inlet passage 64 and into and through a suction motor/fan assembly and a final filter stage within housing 24, prior to being exhausted through the housing vents 26.

Those skilled in the art will certainly recognize that the term "cyclonic" as used herein is not meant to be limited to a particular direction of airflow rotation. This cyclonic action separates a substantial portion of the entrained dust and dirt from the suction airstream and causes the dust and dirt to be deposited in the dirt cup 32. It should be appreciated that an intermediate filter can be provided, for example within the dirt cup outlet passage 62a downstream of the main filter membrane 70, to prevent debris from being sucked directly into the motor/fan assembly in the event of a failure of the main filter element 70.

Figure 7:
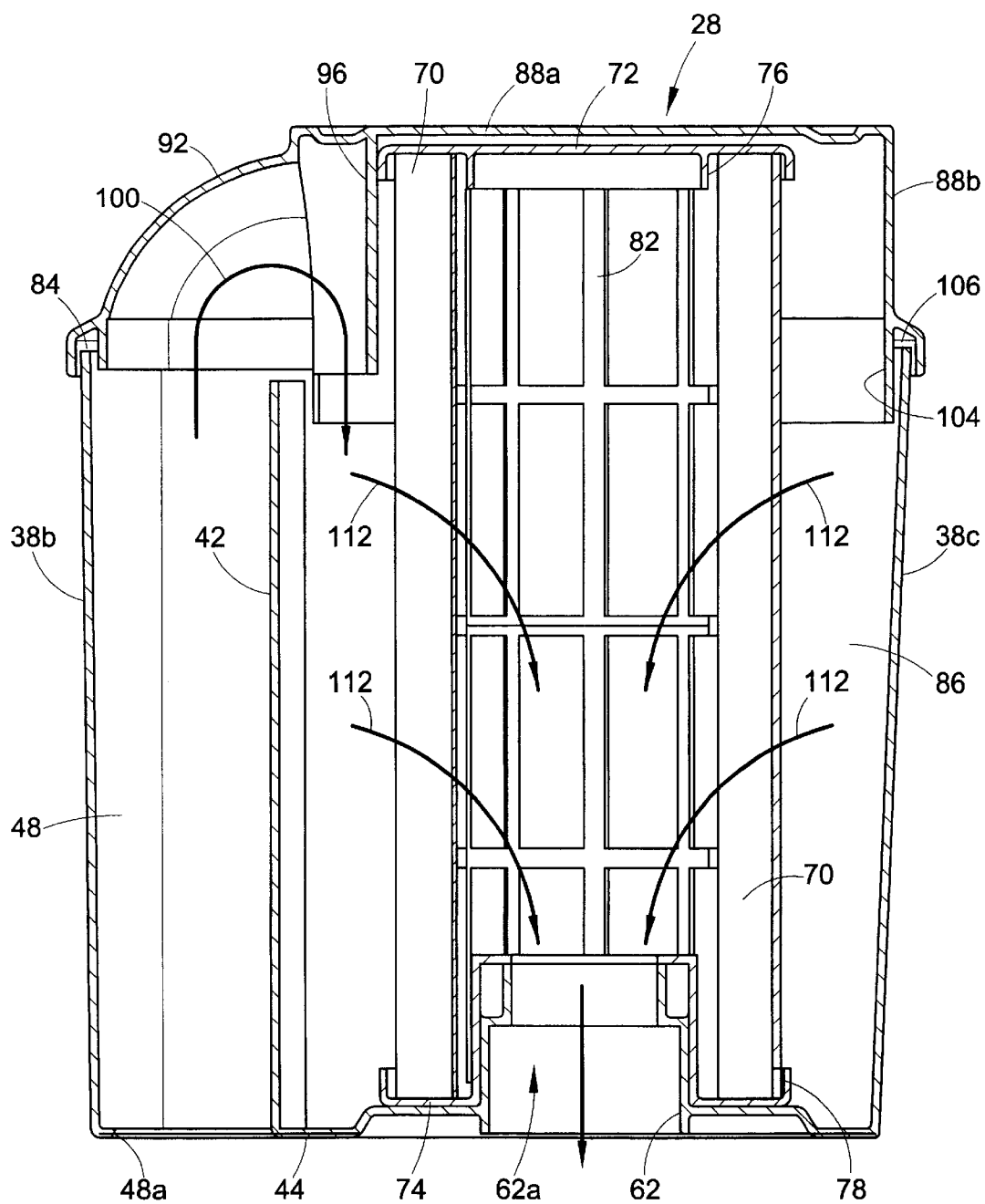
FIG. 7 is another vertical cross-section view of the dirt cup assembly of FIG. 5 taken along the line 7—7.

Referring now to FIG. 7, during above-the-floor cleaning operations, dirty air flows from a cleaning tool/wand arrangement and depending hose 60, through the dirt cup inlet duct 48, and into the dirt cup cyclonic airflow passage 86. As mentioned above, positioning the dirt cup inlet duct 48 slightly rearward of the lower handle portion 16 minimizes the length of the dirty airflow path from an above-the-floor cleaning tool to the dirt cup dust collection chamber 50 to provide increased suction power at the cleaning tool. As with an on-the-floor cleaning operation, dirty air flow from the inlet duct 48 into the cyclonic passage 86 is diverted by diverter 98, as illustrated by arrow 100. This causes a cyclonic or vortex-type flow that spirals downward in the passage 86 since the top end thereof is blocked by the lid 36. The air eventually flows radially inward through the filter membrane 70, and then axially downward through the hollow interior of the filter assembly 34 as illustrated by arrows 112. Subsequently, filtered air flows through the outlet passage 62a, through motor and filter housing inlet passage 64 and into and through a suction motor/fan assembly and a final filter stage within housing 24, prior to being exhausted through the housing vents 26.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described a preferred embodiment of invention, what is claimed is:

1. A dirt cup for a vacuum cleaner, the dirt cup comprising:
   an outer wall;
   a first inner wall that cooperates with a first portion of the outer wall to define a first inlet duct;
   a second inner wall that cooperates with a second portion of the outer wall to define a second inlet duct;
   the first and second inner walls cooperating with a third portion of the outer wall to define a dust collection chamber; and
   a bottom wall joined to lower end edges of the outer wall, first inner wall, and second inner wall.

2. The dirt cup of claim 1, further including a filter support projecting from the bottom wall within the dust collection chamber.

3. The dirt cup of claim 2, wherein the filter support includes an outlet passage through the bottom wall.

4. The dirt cup of claim 1, wherein the first inlet duct includes an inlet aperture adapted for fluid communication with a brushroll chamber of an associated vacuum cleaner.

5. The dirt cup of claim 1, wherein the second inlet duct includes an inlet aperture adapted for fluid communication with an above-the-floor cleaning tool.

6. The dirt cup of claim 1, wherein the first inlet duct is spaced from the second inlet duct by more than about 90°.

7. A dirt cup assembly for a vacuum cleaner, the dirt cup assembly comprising:
   a dirt cup having a dust collection chamber, a first inlet duct, and a second inlet duct spaced from the first inlet duct; and
   a filter assembly removably positioned within the dust collection chamber.

8. The dirt cup assembly of claim 7, wherein the dirt cup further includes a filter support projecting from a lower wall of the dust collection chamber for supporting the filter assembly.

9. The dirt cup assembly of claim 8, wherein the filter support includes an outlet passage through the lower wall.

10. The dirt cup assembly of claim 7, wherein the filter assembly has a tubular form and cooperates with the dirt cup to define an annular cyclonic airflow passage within the dust collection chamber.

11. The dirt cup assembly of claim 7, wherein the first inlet duct includes an inlet aperture adapted for fluid communication with a brushroll chamber of the vacuum cleaner.

12. The dirt cup assembly of claim 11, wherein the second inlet duct includes an inlet aperture adapted for fluid communication with an above-the-floor cleaning tool.

13. The dirt cup assembly of claim 7, wherein the first inlet duct is spaced from the second inlet duct by more than about 90°.

14. The dirt cup assembly of claim 7, further including a lid removably secured to the dirt cup, the lid having a center portion extending over the dust collection chamber, a first wall portion extending over the first inlet duct, and a second wall portion extending over the second inlet duct.

15. The dirt cup assembly of claim 14, wherein the lid further includes a first diverter wall positioned to divert an airflow from the first inlet duct to a tangential path within the dust collection chamber, and a second diverter wall positioned to divert an airflow from the second inlet duct to another tangential path within the dust collection chamber.

16. A vacuum cleaner comprising:
   a nozzle base;
   an upper assembly pivotally secured to the nozzle base; and
   a dirt cup assembly removably secured to at least one of the nozzle base and the upper assembly, the dirt cup assembly including a cup having a dirt collection chamber, a first inlet duct, a second inlet duct spaced from the first inlet duct, and a filter assembly removably positioned within the dirt collection chamber.

17. The vacuum cleaner of claim 16, wherein the cup further includes a filter support projecting from a bottom wall of the dirt collection chamber for supporting the filter assembly.

18. The vacuum cleaner of claim 17, wherein the filter support includes an outlet passage through the bottom wall for communicating with a third inlet duct of a motor and filter housing positioned below the cup.

19. The vacuum cleaner of claim 16, wherein the filter assembly has a tubular form and cooperates with the cup to define an annular cyclonic airflow passage within the dirt collection chamber.

20. The vacuum cleaner of claim 16, wherein the first inlet duct includes an inlet aperture adapted for fluid communication with a brushroll chamber associated with the nozzle base.

21. The vacuum cleaner of claim 20, wherein the second inlet duct includes an inlet aperture adapted for fluid communication with an above-the-floor cleaning tool.

22. The vacuum cleaner of claim 16, wherein the first inlet duct is positioned forward of the upper assembly and the second inlet duct is positioned rearward of the upper assembly.

23. The vacuum cleaner of claim 16, wherein the dirt cup assembly further includes a lid removably secured to the cup, the lid having a center portion extending over the dirt collection chamber, a first wall portion extending over the first inlet duct, and a second wall portion extending over the second inlet duct.

24. The vacuum cleaner of claim 23, wherein the lid further includes a first diverter wall positioned to divert an airflow from the first inlet duct to a tangential path within the dirt collection chamber, and a second diverter wall positioned to divert an airflow from the second inlet duct to another tangential path within the dirt collection chamber.

25. A vacuum cleaner comprising:
   a nozzle base;
   an upper assembly pivotally secured to the nozzle base; and
   a dirt cup removably secured to at least one of the nozzle base and the upper assembly, the dirt cup including a first inlet duct positioned forward of the upper assembly, and a second inlet duct positioned rearward of the upper assembly.

26. The vacuum cleaner of claim 25, wherein the first inlet duct is positioned along a longitudinal axis of the vacuum cleaner.

27. The vacuum cleaner of claim 25, wherein the first inlet duct communicates with a brushroll chamber defined in the nozzle base, and the second inlet duct communicates with an above-the-floor cleaning hose.

* * * * *